Patented Mar. 8, 1932

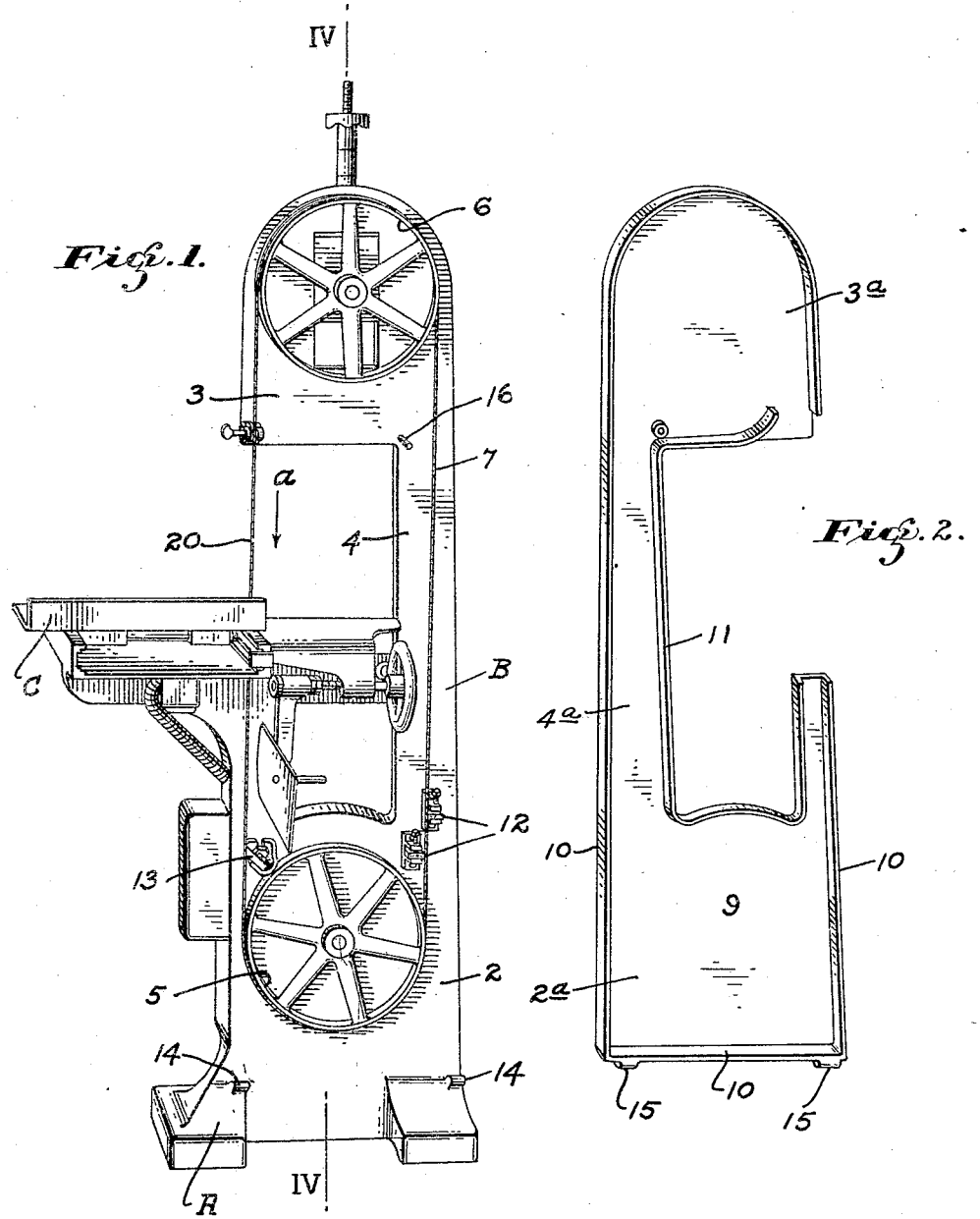

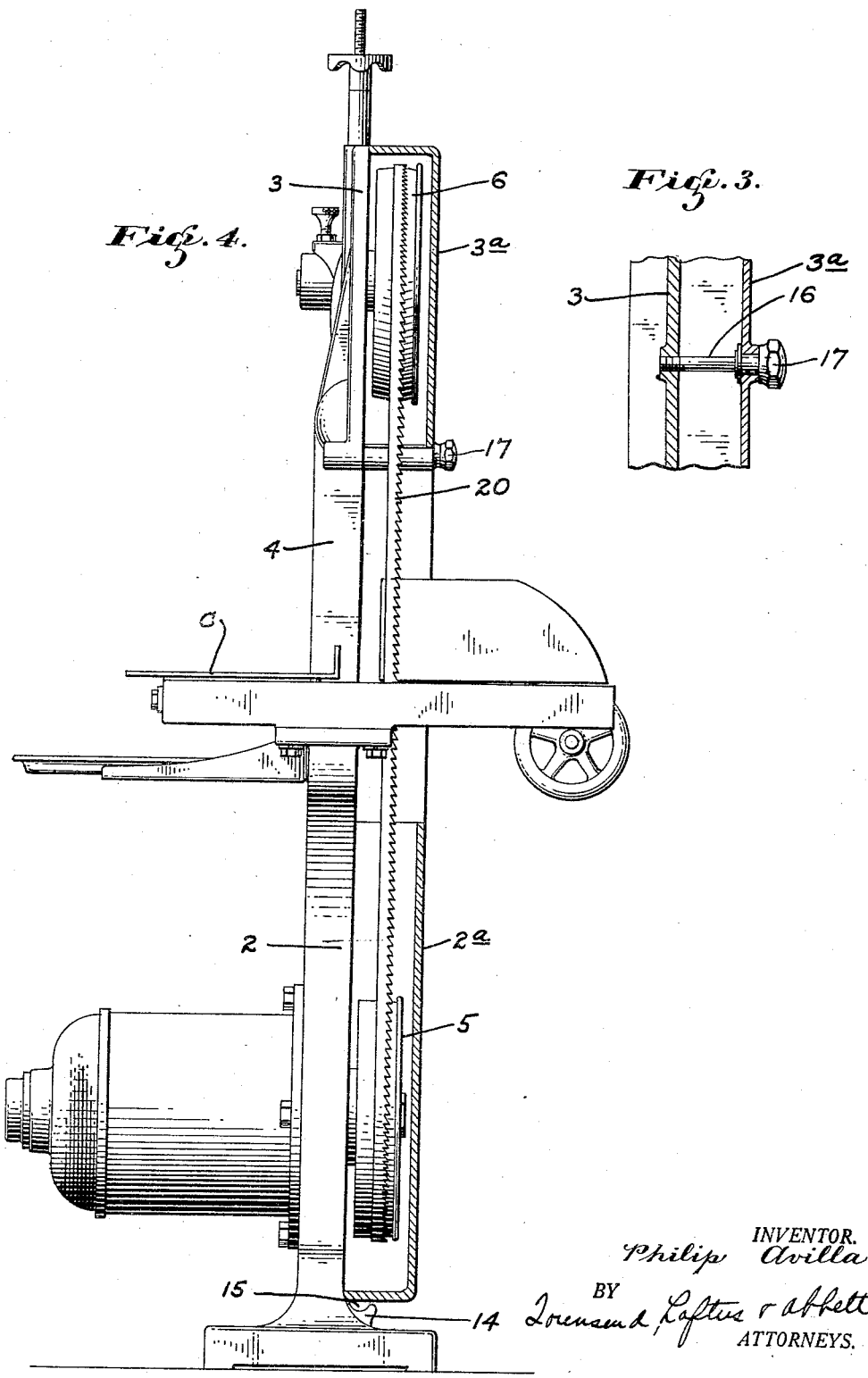

1,848,300

UNITED STATES PATENT OFFICE

PHILIP AVILLA, OF DALY CITY, CALIFORNIA

MEAT CUTTING BAND SAW

Application filed December 10, 1929. Serial No. 413,086.

This invention relates to a meat cutting band saw and especially to improvements in the frame and the cover plate enclosing the major portion of the saw and the pulleys supporting and driving the same.

It is known that band saws are well adapted for use in butcher shops and the like for cutting steaks, chops, roasts, etc. In fact the band saw has been found capable of handling any work and handling it better and quicker and with less waste than has heretofore been possible with the use of knives, cleavers, hand saws, etc. It has however been found the fine particles of meat, bone, cartilage etc., cut away by the teeth of the saw and due to the high speed or velocity of the saw are thrown off and accumulate on the surrounding frame, table, floor, etc., rendering conditions rather unsanitary unless constant cleaning is resorted to.

The object of the present invention is to generally improve and simplify the construction and operation of meat cutting band saws; to provide a supporting frame which may be readily wiped off or cleaned; to provide a frame which permits ready access to the band saw mechanism; to-wit, the saw and the pulleys supporting and driving the same; to provide an enclosing housing to receive and collect the waste matter thrown off by the saw; and further, to provide a housing which may be readily and quickly detached from the frame to permit removal of accumulated waste and cleaning of the frame and band saw mechanism and the cover.

The invention is shown by way of illustration in the accompanying drawings, in which:

Fig. 1 is a perspective view of the meat cutting band saw showing the cover plate removed, Fig. 2 is a perspective view of the cover plate, Fig. 3 is a detailed sectional view showing the detachable screw connection whereby the upper end of the cover is secured to the frame of the band saw, and Fig. 4 is a central vertical section of the machine taken on line IV—IV of Fig. 1.
Referring to the drawings in detail and particularly Figs. 1 and 4, A indicates a base member upon which is supported a vertically disposed frame generally indicated at B. This frame consists of a lower section 2 and an upper section 3, said sections being connected by vertical arm or offset member 4. Journalled in the lower part of the frame is a driving pulley 5 and similarly journalled on the upper end of the frame is an idler pulley 6, said pulleys forming a support and drive for a standard form of band saw generally indicated at 7.

Where a band saw of this character is employed in butcher shops or the like for cutting meat, bone, etc., it is difficult to keep the machine and surrounding objects in a sanitary condition unless cleaning is constantly resorted to. This is due to the fact that the small particles of meat, bone, cartilage, etc., cut away by the teeth of the saw are thrown off on surrounding objects such as the table C, the frame B and the surrounding floor etc. The purpose of the present invention is to design a frame and a cover member therefore which substantially encloses the band saw mechanism to-wit, the saw and the supporting pulleys so as to confine and collect the fine waste matter which would otherwise be thrown off.

This is accomplished by first of all forming a flat surface on the parts of the frame indicated at 2, 3 and 4, and secondly, by providing a cover member such as shown in Fig. 2 which may be readily applied or removed as conditions demand. The cover member consists of a flat plate such as indicated at 9, the outer end inner edges of which are provided with flanges such as are indicated at 10—10 and 11. The portion of the housing indicated at 3a covers the upper idling pulley 6 and the frame portion 3. The portion of the cover plate indicated at 4a covers the portion of the frame indicated at 4 and the major portion of one run of the saw and the portion of the cover indicated at 2a covers the lower part of the frame indicated at 2 and the driving pulley 5. The cover generally speaking is channel-shaped in cross section at any part and it may be said that the flanges 10 and 11 are sufficiently high to maintain the cover in spaced relation to the pulleys and the saw. If such is the case waste matter projected by the saw will be intercepted and collected within the cover member and particularly in the lower portion thereof as wipers such as indicated at 12 and 13 are maintained in contact with the saw blade, thus wiping off any waste matter adhering thereto and causing it to be deposited in the lower part of the cover member.

Where a saw is being continuously used the waste matter accumulates rather rapidly and it is accordingly necessary to remove the cover from time to time. In order that the cover may be quickly and readily removed or applied a pair of lugs 14 are formed on the base part of the frame. A pair of co-operating ears 15 are formed on the lower edge of the cover and these engage the lugs 14 thereby forming a pivot for the lower end of the cover and in addition thereto a pivotal support which permits the cover to be lifted away from the frame. The upper frame member 3 carries a stud bolt 16, see Figs. 1 and 3, and the cover member carries a nut 17 which is freely rotatable thereon but secured against endwise movement. Hence if the cover is placed in position on the lugs 14 and swung inwardly against the frame stud 16 will register with the nut and by turning the nut the threads are engaged and the cover is clamped against the face of the frame. Conversely if it is desired to clean the machine and remove the accumulated waste matter it is only necessary to rotate the nut in the opposite direction thus freeing it from the stud and permitting it to be swung outwardly on the lugs 14. The cover containing the waste matter may thus be removed to a point where it may be wiped out or cleaned with a hose or the like and as the surface of the frame presents a flat face it is obvious that this can be readily wiped off and it is further apparent that the pulleys and the saw are in a position where they are accessible to wiping and cleaning. After this is accomplished the cover is again applied and secured by nut 17. The operation of cleaning the machine is thus exceedingly simple and is quickly accomplished. The only part of the saw which is exposed is that indicated at 20. This portion of the saw passes through the meat or other material placed upon the table C and as such cannot be covered but as the movement of the saw is downward or in the direction of the arrow a, the waste removed by the teeth of the saw is carried downwardly into the cover member and is there disposed of either by being thrown off or by being wiped off by the members 12 and 13, hence the machine may be kept in a clean and sanitary condition at all times.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

In a meat cutting band saw, a vertically disposed frame, one side of said frame presenting a flat surface extending to the very margin of the frame, a work table on the frame, an upper and a lower pulley journaled on the frame adjacent the flat surface thereof, a band saw carried by the pulleys, a cover plate having a shape or outline substantially the same as that of the frame and the flat surface formed thereon, a marginal flange formed on the cover plate and maintaining a spacing between the flat surface of the frame and the cover plate, and means securing the flanged cover plate to the flat surface of the frame whereby a continuous tight joint is maintained between the flat surface and the cover plate, said cover enclosing the pulleys and all of the saw except a small portion above the work table and said cover forming a receptacle to receive all waste matter removed by the saw.

PHILIP AVILLA.